No. 638,271. Patented Dec. 5, 1899.
C. J. PIHL.
BICYCLE BRAKE.
(Application filed Mar. 31, 1898.)
(No Model.) 3 Sheets—Sheet 1.
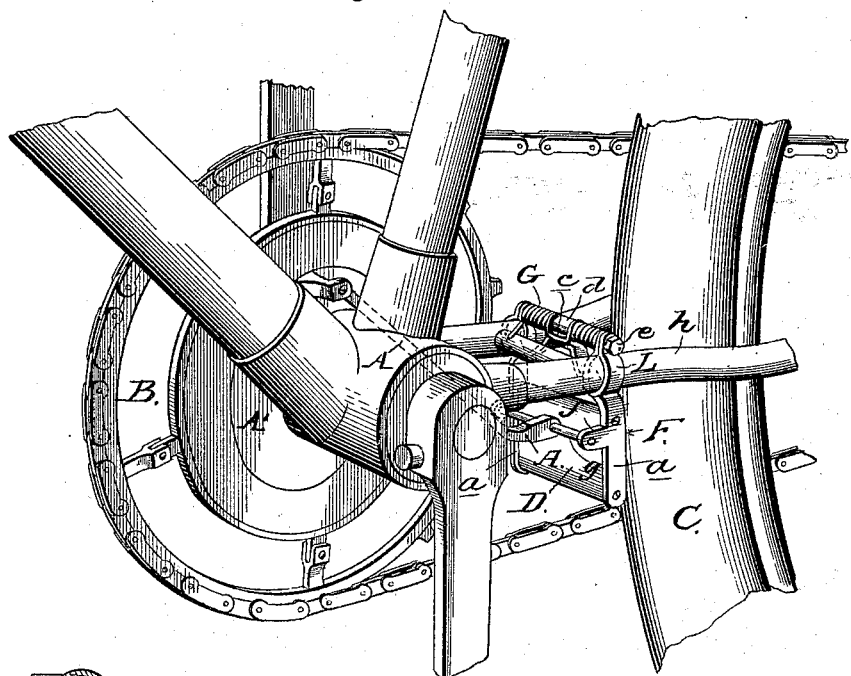
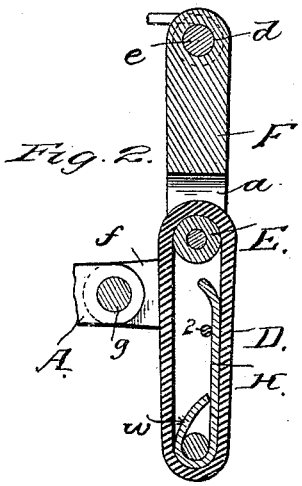
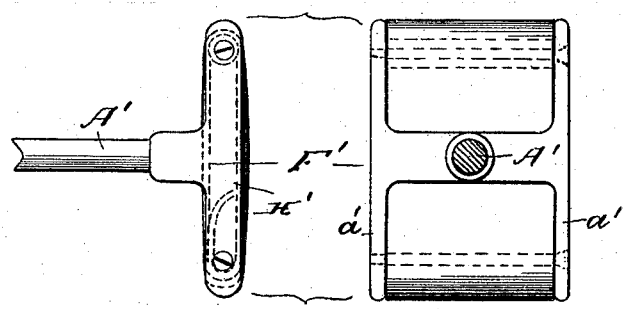
Witnesses
Chapman N. Fowler
Charles M. Birckhead
Inventor
Carl J. Pihl,
by T. Walter Fowler
his Attorney.

No. 638,271. Patented Dec. 5, 1899.
C. J. PIHL.
BICYCLE BRAKE.
(Application filed Mar. 31, 1898.)
(No Model.) 3 Sheets—Sheet 2.
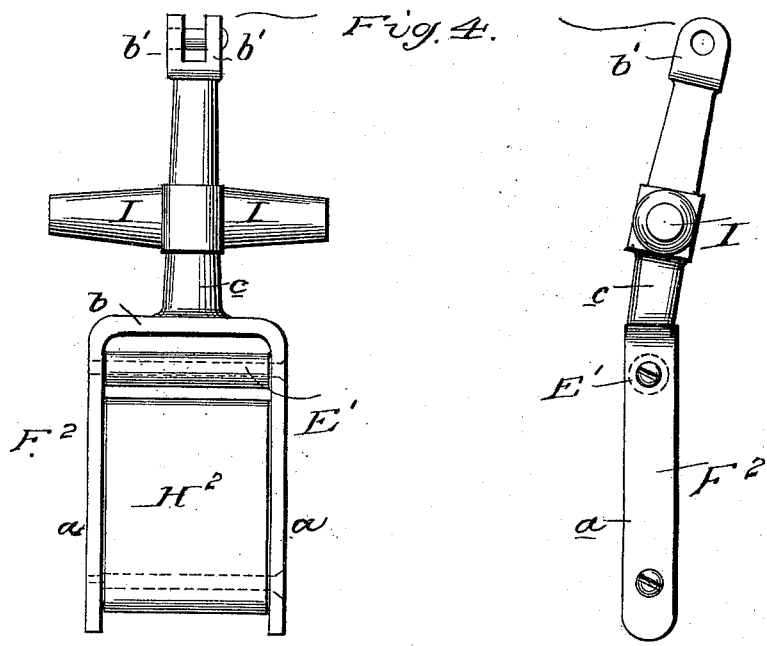
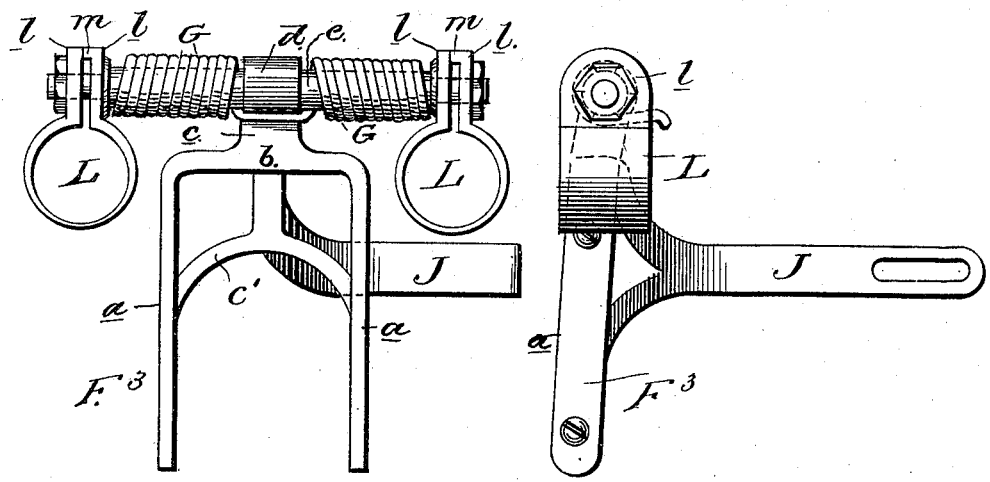
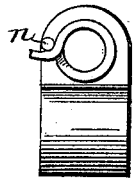
WITNESSES
Chapman W. Fowler
Charles M. Birckhead.
INVENTOR
Carl J. Pihl,
by T. Walter Fowler
his Attorney No. 638,271. Patented Dec. 5, 1899.
C. J. PIHL.
BICYCLE BRAKE.
(Application filed Mar. 31, 1898.)
(No Model.) 3 Sheets—Sheet 3.

WITNESSES
Chapman N. Fowler
Charles M. Birckhead.

INVENTOR
Carl J. Pihl,
by P. Walter Fowler
his Attorney

UNITED STATES PATENT OFFICE.

CARL J. PIHL, OF NEW YORK, N. Y., ASSIGNOR OF ONE-HALF TO A. M. SUTHERLAND, OF SAME PLACE.

BICYCLE-BRAKE.

SPECIFICATION forming part of Letters Patent No. 638,271, dated December 5, 1899.

Application filed March 31, 1898. Serial No. 675,924. (No model.)

*To all whom it may concern:*

Be it known that I, CARL J. PIHL, a citizen of the United States, residing at New York, (Brooklyn,) in the county of Kings and State of New York, have invented new and useful Improvements in Bicycle-Brakes, of which the following is a specification.

My invention relates to a new and useful brake for application to a bicycle or other wheeled vehicle and of that type employing an endless band mounted on rollers or otherwise, whereby a sliding contact is made with the tire of the vehicle to reduce the friction and consequent wear of the opposing parts and to prolong the life of the usual rubber or other inflatable tire commonly used on bicycles and other vehicles.

My invention consists, essentially, in the parts and the constructions and combinations of parts constituting the improved brake, which I shall hereinafter fully describe and claim.

Figure 8:
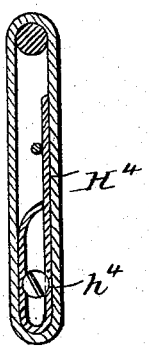
Figure 9:
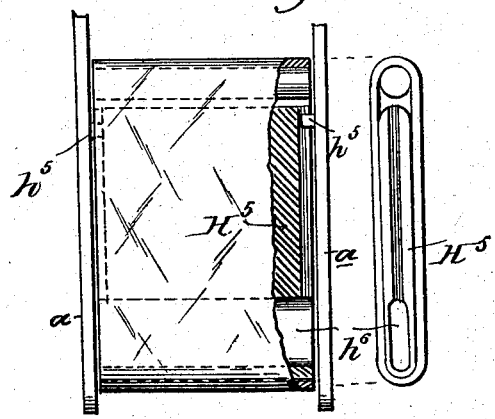

In the accompanying drawings, forming part of this specification and in which similar letters of reference indicate corresponding parts, Figure 1 is a perspective view of a portion of a bicycle having means for operating my improved brake by the movement of the pedals. Fig. 2 is a longitudinal sectional view of the brake detached. Figs. 3 and 4 are other forms of brakes to which my invention is applied. Figs. 5 and 6 are front and side views of still another form of brake. Fig. 7 is a modification showing another method of securing the necessary tension to the spring which normally holds the brake out of contact with the tire. Fig. 8 is a sectional view of an endless belt with an adjustable friction-plate between its folds. Fig. 9 represents another modified form of brake.

The object of the present invention is to provide a simple brake attachable to the various types of bicycles and other vehicles and which will be light, out of the way, and may be operated by a back-pedaling mechanism, by a vertical brake-rod, or by rods or means operated by hand or foot which push or pull the brake into contact with the tire to retard the motion of the machine.
In Fig. 1 I illustrate my brake as attached to a mechanism which operates a rod A, connected with an appropriate mechanism contained within or on the sprocket-wheel B of the machine, whereby when back-pedaling is resorted to a backward pressure is given the rod A to force the brake-shoe against the tire C. This brake may be used in conjunction with any of the well-known clutch mechanisms of the usual bicycle coasters or back-pedaling mechanisms, but the rod A is herein shown as connected with a ring or disk A', which is operated by the mechanism fully described and claimed in another application filed by me May 5, 1898, Serial No. 679,837. The brake-shoe in this case consists of an endless band or belt D of some suitable flexible material—as rubber, leather, or canvas, for example. This belt is mounted on one or more rollers E, rotatively placed between the parallel sides $a$ of a hanger F, whose upper cross-bar $b$ (see Fig. 5) has a projecting neck $c$, terminating in a socket $d$ or bearing to receive a bolt or pin $e$, whereby the hanger is pivotally suspended and may be swung toward and from the tire, a spring G being coiled around the bolt $e$ and so connected with the hanger that the normal tendency of the spring is to hold the brake shoe, band, or belt out of contact with the tire. The side arms $a$ of the hanger have projecting lugs or ears $f$ for a rod or bolt $g$, to which the operating-rod A is attached, as shown in Figs. 1 and 2, and the bolt upon which the hanger swings is firmly secured to the horizontal forks $h$ of the bicycle-frame by means of clamps L, one type I will hereinafter describe.

In order to strengthen the band or belt to transfer the friction and wear to its inner surface and to adjust the tension of the belt when necessary, I locate within the belt or band, between the inner faces of the upper and lower folds thereof, a friction-plate, several types of which I illustrate in the drawings. In Fig. 2 this friction-plate H consists of a flat plate lying against the inner face of the belt and having one end curved and returned substantially upon itself. In this instance but one loose roll is required for the belt to run on, as the curved end of the plate H serves as a substitute for the second roll, and the bolt or rod of such second roll passes through the bight of the folded end of the plate, as shown in Fig. 2, and the opposite end portion of the plate is maintained in place against the belt by means of a pin 2 or other means passing between the folds of the belt and secured in the side arms of the hanger.

In the form of wear-plate shown in Fig. 2 the curved or folded end $w$ thereof is turned inward and is brought substantially into contact with the inner face of the body portion of the plate to serve as a reinforce or brace to resist the inward pressure of the belt upon the plate. A plate of this character need not be longitudinally adjustable, as are others hereinafter described, but may be of a fixed character.

In some machines the brake is actuated by a vertical brake-rod $A'$, as in Fig. 3, in which case the rod is connected centrally with the cross-bar which connects the side arms $a'$ of the frame or hanger $F'$, which carries the belt and roller or rollers and friction-plate $H'$, and in other cases a rod from a bell-crank or other lever actuates the brake by pulling the brake-shoe against the tire.

In Fig. 4 the hanger $F^2$, which carries the friction-plate $H^2$ and roller $E'$, is provided with trunnions I, about which the hanger swings, and the portion of the neck of the hanger above the trunnions is provided with ears or lugs $b'$ for the attachment of a rod or other device, which when operated swings the hanger $F^2$ about its trunnions and brings the belt or band (not shown in Fig. 4) into contact with the tire.

In Figs. 5 and 6 the hanger $F^2$ is substantially of the form shown in Figs. 1 and 2, except that the side arms of the hanger are joined by a bar or plate $c'$, from which curves rearwardly a bar or lever J, which will form a ready means for operating the brake by the foot or under other circumstances when desirable. In Figs. 5 and 6 I illustrate the clamps which secure the hanger to the frame of the machine. These clamps consist of split rings L, adapted to embrace the horizontal forks of the machine-frame, as shown in Fig. 1, and from the split rings extend parallel lugs $l$ with alined holes for the bolt upon which the hanger swings. One of the lugs of each pair has an inturned lip $m$, which rests against the face of the opposing lug to form a fulcrum-point, whereby when the nuts on the bolt are tightened the split portions of the rings are drawn toward each other and the forks of the frame tightly clamped. The spring G, which holds the hanger normally away from the tire, may be given the proper tension after the parts are assembled by passing its terminals over a rod or bar, as in Figs. 1 and 6, or under a pin $n$, projecting from the clamp, as in Fig. 7, or by other suitable means without departing from the spirit of my invention.

As before stated, each of the various hangers will be provided with an endless band or belt forming a movable contact brake-surface for the tire. The belt may run over one roller and the curved end of an interposed friction-plate, or it may run over two rollers $E'$, as shown in Fig. 9, in which latter instance the friction-plate $H^3$ is a solid piece introduced between the folds of the belt so as to frictionally engage the inner faces of both folds of the belt, the plate being secured in place by bolts or rods passing through holes $h^2$ in the plate and secured in the side arms of the hanger. These friction-plates may be fixed ones; but they are preferably adjustable, which adjustment may be accomplished by various means.

In Fig. 8 the friction-plate $H^4$ is similar to the one shown in Fig. 2, except that a bolt, pin, or screw $h^4$ passes through the folded portion of the plate and when loosened allows the plate to be moved to stretch the belt or band and when tightened to secure the plate in its adjustment.

In Fig. 9 the friction-plate $H^5$ has grooved edges for dowel-pins $h^5$ to work in and has a transverse slot or opening $h^6$ for a pin or bolt. This plate is guided in its adjustment by the pin-and-groove connection and is clamped or held after adjustment by a bolt or screw in the usual manner.

In all of the forms the belt or band moves with the tire when it is brought into contact therewith, but does not cut or wear the face of the tire, as the friction is transmitted by the interposed friction-plate to the inner face of the belt, thereby prolonging the life of the tire.

The brake is comparatively inexpensive and is especially adapted to inflatable tires, and the forms herein shown and described are susceptible of still further modification without material departure from the principles and spirit of my invention, for which reason I do not wish to be understood as limiting myself to the precise embodiment of brakes herein shown.

Having thus described my invention, what I claim as new, and desire to secure by Letters Patent, is—

1. A brake, including an endless band or belt and a friction-plate adjustably mounted therein.

2. A brake, including an endless band or belt having parallel sides and rounded ends and a friction-plate adjustably mounted between the inner sides of the belt and conforming substantially to the outline thereof.

3. A brake, including an endless band or belt, and a friction-plate adjustably mounted between the inner sides thereof and having one end rounded for the belt to run over.

4. In a brake, the combination of a hanger consisting of side arms and a connecting cross-bar, a roller mounted between said arms, an endless band or belt, and a friction-plate between the inner sides of the belt and adjustably mounted, and having a rounded end over which and said roller the belt is adapted to move.

5. A brake, consisting of a hanger, an endless band or belt carried thereby, and a plate adjustably mounted within the belt, having a straight side to frictionally contact therewith and a rounded end over which the belt is designed to run.

6. A brake consisting of a hanger, an endless band or belt, a friction-plate within the belt having one end curved, for the belt to run over, and returned substantially upon itself, and a pin or bolt passing through the curved end of the plate whereby the plate is secured.

7. In a brake, a hanger consisting of parallel side arms and connecting cross-bar, a friction-plate adjustably mounted between the arms and having a rounded end, for one end of the band or belt to run on, and a roller between said arms for the opposite end of the band or belt to run on.

8. In a brake, a suspended hanger comprising side arms and connecting cross-bar, a spring on the suspending bolt or rod of the hanger for holding said hanger normally away from the tire, said hanger having, also, an extending lever-arm, an endless band or belt movable between the arms of the hanger and having substantially parallel sides and rounded ends and a friction-plate adjustably mounted between the folds of the band or belt and in contact with the inner face of the latter.

In testimony whereof I have hereunto set my hand in presence of two subscribing witnesses.

CARL J. PIHL.

Witnesses:
A. B. CHALMERS,
A. M. SUTHERLAND.